(12) United States Patent
Ogletree et al.

(10) Patent No.: US 9,489,027 B1
(45) Date of Patent: Nov. 8, 2016

(54) SYSTEM AND METHOD FOR THE ACCURATE RECORDATION OF POWER CONSUMPTION IN A COMPUTING DEVICE UTILIZING POWER PROFILES

(71) Applicant: WAVE RESOURCE STRATEGIES, INC., Birmingham, AL (US)

(72) Inventors: Timothy James Ogletree, Pelham, AL (US); Robert Eric Bernstein, Mountain Brook, AL (US); Joseph James Franks, Jr., Birmingham, AL (US); Kenneth Richard McKibben, Ashville, AL (US); James Martin Murphy, Birmingham, AL (US)

(73) Assignee: Wave Resource Strategies, Inc., Birmingham, AL (US)

( * ) Notice: Subject to any disclaimer, the term of this patent is extended or adjusted under 35 U.S.C. 154(b) by 0 days.

(21) Appl. No.: 14/841,481

(22) Filed: Aug. 31, 2015

(51) Int. Cl.
*G06F 1/26* (2006.01)
*G06F 1/00* (2006.01)
*G06F 1/32* (2006.01)

(52) U.S. Cl.
CPC ........... *G06F 1/3203* (2013.01); *G06F 1/3206* (2013.01); *G06F 1/3234* (2013.01); *G06F 1/26* (2013.01)

(58) Field of Classification Search
CPC .................................... G06F 1/32; G06F 1/26
See application file for complete search history.

(56) References Cited

U.S. PATENT DOCUMENTS

| | | | | |
|---|---|---|---|---|
| 7,487,058 B2 * | 2/2009 | Gross | ...................... | G06F 11/30 700/28 |
| 7,644,051 B1 * | 1/2010 | Moore | ................. | G05B 13/027 706/16 |
| 8,527,105 B1 * | 9/2013 | Choong | ................. | G01D 4/004 315/294 |
| 2009/0300384 A1 * | 12/2009 | Archer | .................. | G06F 1/3203 713/320 |
| 2010/0005331 A1 * | 1/2010 | Somasundaram | ........ | G06F 1/28 713/340 |
| 2011/0018346 A1 * | 1/2011 | Dixon | ................... | G06F 1/3203 307/39 |

* cited by examiner

*Primary Examiner* — Phil Nguyen
(74) *Attorney, Agent, or Firm* — The Gache Law Firm, P.C.; Russell C. Gache

(57) ABSTRACT

A method for establishing a power profile for a computing device and then using that profile for future power calculations and cost savings estimates after the implementation of a selected power scheme in the computing device is disclosed. This is accomplished by establishing a power profile on a model computing device and then matching that profile to other machines that are similar in configuration. Each tested machine has a power profile that is recorded and saved in cloud based memory storage. A striated matching methodology is utilized to provide the best profile match for each target machine in the enterprise which allows for accurate power calculations for each machine based upon similar original target machine profiles. Once power calculations are done for target machines based on the established profiles, power schemes can then be deployed across an enterprise computing landscape and power calculations taken again to determine potential power savings.

15 Claims, 6 Drawing Sheets

SYSTEM AND METHOD FOR THE ACCURATE RECORDATION OF POWER CONSUMPTION IN A COMPUTING DEVICE UTILIZING POWER PROFILES

FIELD OF THE INVENTION

The present invention relates generally the recordation of power consumption in a computing device. In greater particularity, the present invention relates to profiling of the power consumption of a PC. In even greater particularity, the present invention relates to creating a power profile for a PC and deploying power scheme settings to a collective of PCs in an organization based upon power consumption usages for each PC where such usages are calculated using the power profile for the PC.

BACKGROUND OF THE INVENTION

The power costs to operate a typical desktop computer and monitor often averages between $50-$75 per year, depending on factors such as usage and configuration. In some instances, power consumption in advanced CPU processing systems such as on computer server farms can be as high as $100 per year per unit. For an organization operating thousands of machines across multiple locations, these monthly energy costs can quickly add up to hundreds of thousands of dollars.

IT departments have known for some time that by analyzing usage patterns and managing the power state of the components inside a PC energy usage can be controlled. For example, the following elements of a typical PC can be individually and actively controlled to reduce power consumption: CPU(s); monitor; hard drives; USB ports; and PCI buses. Further, IT department personnel have known that power consumption in a computing environment is real, and needs to be controlled. For example, recently Google, Microsoft, and others have located computer server farms in northern climates such as Finland and Canada to reduce the cost and complexity of cooling their computing facilities. And, while heat created by PCs in the general workplace environment may not be as dramatic as in high performance server farms, the power consumption is still real and substantial power savings can be realized by organizations. Moreover, organizations are increasingly conscious of the depth of carbon footprints created by their activates and reduction efforts are ongoing as part of the "green revolution."

The problem is that such management can be time consuming for IT departments because each organization typically has many variants of PCs, laptops, tablet PCs, and other computing devices, and each model variant must have its own tailored power scheme to reduce power consumption, and that scheme must also be customized in a manner that is compatible with the computing demands of that device within the organization. Further, IT departments typically do not even address the power consumption reduction strategies because they do not know if such additional effort would result in substantive savings to the organization, or if such savings will outweigh the cost of the additional IT personnel man hours required to configure each computing device.

Therefore, what is needed is a process for easily establishing an accurate cost savings expectation for an enterprise computing topology if power consumption protocols are established, and then deploying power schemes across the computing environment in response to such cost savings quantification.

SUMMARY OF THE INVENTION

In summary, the invention consists of a method for establishing a power profile for a model computing device and then using that model profile for future power calculations and cost savings estimates in similar computing devices. This is accomplished by establishing a power profile using an actual power meter on a model computing device and then matching that profile to other machines that are similar in configuration. Typically, a set of model machines that are representative of enterprise networked machines are tested to create a model profile group of likely representative profiles. Each tested machine has a power profile that is recorded and saved in cloud based memory storage. Because the number of model power profiles will increase over time, a striated matching methodology is utilized to provide the best profile match for each target machine in the enterprise. Power calculations for each machine based upon the target machine profile may then be taken and recorded for a predetermined period of time, typically two weeks. Power schemes can then be deployed across an enterprise computing landscape and power calculations taken again. The result is a practical methodology for knowing real power savings across an enterprise resulting from power scheme deployment. Other features and objects and advantages of the present invention will become apparent from a reading of the following description as well as a study of the appended drawings.

BRIEF DESCRIPTION OF THE DRAWINGS

A method for the accurate, profile based calculation of power consumption in a computing device incorporating the features of the invention are depicted in the attached drawings which form a portion of the disclosure and wherein.

DESCRIPTION OF THE PREFERRED EMBODIMENTS

Figure 1:
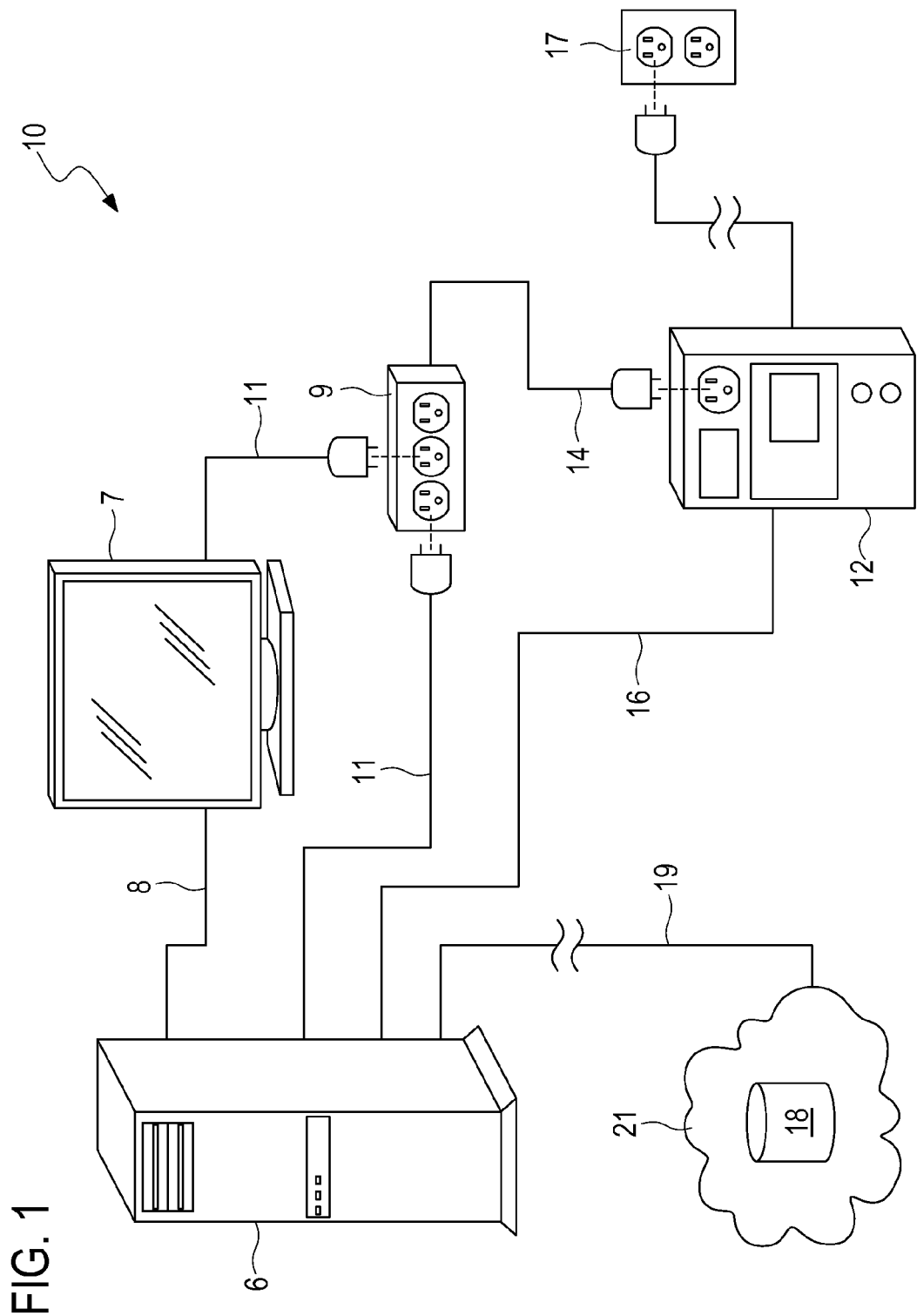
FIG. 1 is a system topology for testing a model computing device.

Referring to the drawings for a better understanding of the function and structure of the invention, FIG. 1 shows a testing system 10 for establishing a model profile for a selected computing device 6 with monitor 7, such as for example a personal computer or PC. Monitor 7 is connected to machine 6 having typical internal components, such as a disk drive, internal RAM, a mother board with a processor and bus electronics, a graphics processor, power supply, and an Ethernet card or motherboard subsystem for communicating with other machines via a network cable 19, or communicating with remotely located webservers or to access cloud based storage 18 across the Internet 21. The PC has an operating system such as Microsoft Windows® version 8.1, or Linix, and includes typical communications software for interacting with remove devices as is known. PC 6 is connected to monitor 7 via cable 8, such as a VGA graphics cable, digital graphics cable, or HDMI cable, depending upon the selected type of graphics output port. Power is supplied to the monitor and PC via their respective power cables 11 through a multiport power connector 9. Further discussion regarding the nominal operation of a PC, its monitor, and networking communications via networking infrastructure devices and connections to remotely located memory like cloud based storage shall be omitted since these elements and processes are well understood and not needed for a full understanding of the herein described invention.

A power measuring device 12 is positioned to supply power to multiport 9 via power cord 14 via powered supplied to the device 12 through a household electrical plug 17. A communications cord, such as a USB cord 16 connects the measurement device to the PC. A suitable power measuring device 12 for system 10 is the Watts up? PRO ES Model No. 82756 available from Think Tank Energy Products, Inc. located in Denver, Colo.

Figure 2:
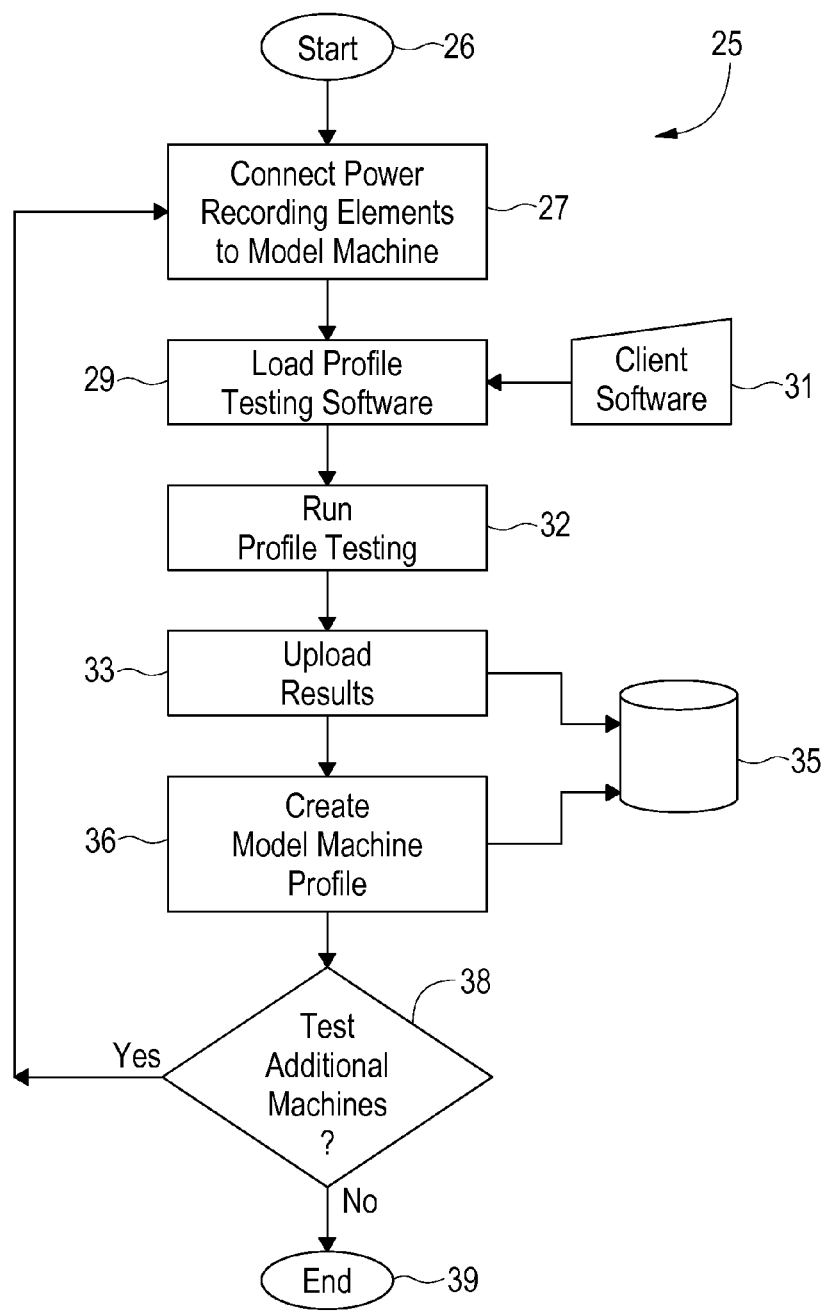
FIG. 2 is a flow diagram for testing a model machine to establish a power profile.

Referring to FIG. 2, a testing process 25 is conducted to record power data from a model machine. Initially, a model PC 6 with monitor 7 is configured 27 as shown in FIG. 1. Profile testing software 31 is loaded 29 onto PC 6 and power exercises are run on the PC 6 and power readings received from power meter 12 via USB cable 16, then stored. The sequence of power exercises that are run on the PC are shown below. As each test is run, power meter 12 sends actual power consumption information to the PC which is recorded. The following power exercises 32 are performed.

Power Exercise Activities
1. PC is run at idle processor activity level with the monitor(s) switched to off state for 60 seconds.
2. PC is run at 100% utilization processor activity level with the monitor(s) switched to off state for 60 seconds.
3. PC is run at idle processor activity level with the monitor(s) switched to on state for 60 seconds.
4. PC is placed into hibernation mode for 2 minutes.

The following power metrics are then recorded:
a. Wattage at processor idle with monitor(s) off.
b. Wattage at processor idle with monitor(s) on.
c. Wattage at processor at 100% utilization with monitor(s) off.

The following power metrics are then calculated and saved:
a. The power consumption of the monitor in watts (above exercise no. 1 result above less above exercise no. 3 result).
b. A CPU Slope value for the system ((above exercise no. 2 result less exercise no. 1 result)/100).
c. A base level power in watts (above exercise no. 1 result).

These power metrics are recorded locally and then uploaded 33 into a power profile record in cloud storage 35 within a model machine profile 36 with variable indexing depending upon the scaled size of the DB and the information to be saved for each profile. The media access control address or "MAC" address of the PC 6 that as typically contained in the network interface card (NIC) or network subsystem in the PC is saved with the power information database 35. A uniform representative file format utilized by the inventors for recording machine information and power profile information as saved in cloud storage element 35 is shown at Table 1. This file format shows typical information saved from each profiled machine, whether the machine is a model machine or not and whether or not the machine has been actually tested with an actual power meter. The Table, includes bolded "" references to indicate explanatory parentheticals next to each data entry that records critical power calculation entries necessary for further profile calculations by matched machines, as will be discussed. After the first model machine is tested, additional machines representative of the majority types of machines in an organization are tested 38 and their readings saved. After all of the representative types of machines in an organization are tested in the testing environment of 10**, a profile matching process for target machines in an organization may be initiated.

TABLE 1

{
"_id": "152a4e0e-c5ef-419e-a074-d761aa5e2324",
"_rev": "148-fc4aadce9205f3676538619afaac7699",
    "macAddress": "00054e4d7624", (MAC address; dashes removed, all lower case)
"customerCode": "uatdotorg",
"computerName": "LUCIUS-PC",
"lanIP": "192.168.44.26",
"gatewayIP": "192.168.44.1",
"subnetIP": "255.255.255.0",
"cpuManufacturer": "Intel(R) Pentium(R) M processor 1.80GHz",
(CPU designator)
    "numOfCpus": 1, (No. Of CPUs present in the model machine)
    "cpuSpeed": "1800", (CPU Speed in MHz)
    "ram": "1047544", (amount of RAM present in the model machine)
"version": "1.2.2.0",
"powerSettingsApplied": false,
"powerSettings": {
    "monitorOffTimeout": 5,
    "sleep": 30,
    "hibernate": 360,
    "diskSleep": null
},
"lastModifiedAt": "2015-08-13T13:46:09.022472-05:00",
"monitors": [
    {
        "manufacturer": "2L\u001eS\u000e",
        "model": "G018w1",
        "widthMm": 410,
        "heightMm": 257,
        "sizeIn": 19.1,
           "on": 9.428666666666667 (Wattage of Monitor when on in Watts)
    },
    {
        "manufacturer": "",
        "model": "",
        "widthMm": 0,
        "heightMm": 0,
        "sizeIn": 0,
        "on": 9.428666666666667
    }
],
"timezone": "Central Standard Time",
  "cpuSlope": 0.11388996168582388, (CPU calculated slope)
"diskSlope": null,
"baseLevel": 29.63444444444444, (Base Level Wattage in Watts)
  "hibernateWatts": 0, (Hibernation state Wattage in Watts)
  "precisionMatchLevel": 6, (Match Level)
"group": "69047e2843fb03e8e207cfba69000069",
"groupName": "No Group",
"type": "Hardware",
"createdAt": "2015-08-13T16:47:55.359Z",
"updatedAt": "2015-08-17T00:00:08.909Z",
"replicateUrl":
"https://00054e4d7624:pepaxoxozo@
db.waveresource.com/uatdotorg%2Fx00054e4d7624",
"usage": {
    "allTime": {

TABLE 1-continued

```
        "total": 0,
        "avg": 0
    },
    "thirtyDay": {
        "total": 0,
        "avg": 0
    },
    "sevenDay": {
        "total": 0,
        "avg": 0
    },
    "yesterday": {
        "total": 0,
        "avg": 0
    },
    "isActive": false
}
```

Figure 3:
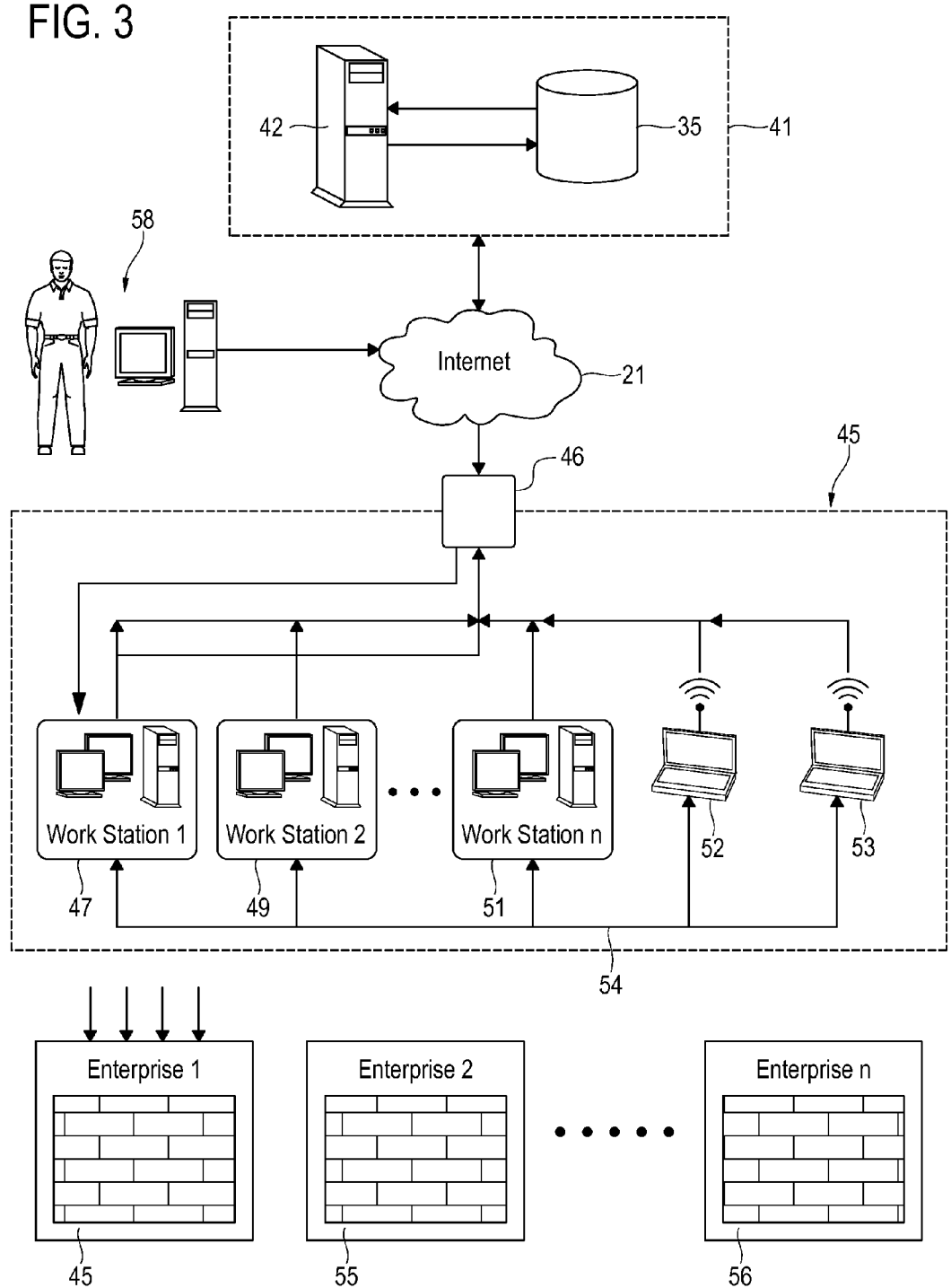
FIG. 3 is a network topology diagram showing the elements of a system incorporating the invention.

Referring now to FIG. 3, the information shown in the file depicted in Table 1 is saved in cloud storage 35. Communication infrastructure 41 includes cloud storage 35 and a webserver 42, and is used to communicate with computing devices, such as PC workstations 47-51, and other computing devices such as notebook computers 52-53. Webserver 42 includes the capability to communicate through JavaScript Object Notation (aka "JSON") using human-readable text to transmit information from storage 35 to any machine on enterprise network 45 through asynchronous communication. Webserver 42 also includes the ability for file access, storage, and downloading via a web browser from any workstation having the proper credentials access. Storage 35 preferably utilizes CouchDB as a NoSQL database that enables the file shown in Table 1 to be saved and altered as a JSON document, as well as provide a scalable database to accommodate appended data and fluid data integration from other sources into the file shown in Table 1. CouchDB is available from the Apache Software Foundation, located in Los Angeles, Calif. In addition, local file information on each machine is saved in a database via the application PouchDB, which is an open-source JavaScript database that runs locally on the workstation as part of the application installation and can communicate with remotely located storage 35—saving information local on each workstation—but uploading file information via automatic synchronization with the CouchDB storage 35 at timed intervals. Access and a license to PouchDB may be obtained from GitHub, or at www.pouchdb.com. Data between local workstation storage and cloud storage 35 flows through the Internet 21 and via local network enterprise devices such as routers and switches, as is known in the industry. IT managers or other assigned IT personnel can access infrastructure 41 via remote workstation 58 as needed to manage records, application files, and webserver configurations, and generally to provide maintenance to the infrastructure 41. As shown, enterprise infrastructure 45 communicates with communication infrastructure 41, but other enterprise infrastructures 55-56 may easily also communicate with communication infrastructure 41 to save files and communicate with webserver 42 in a multiplexed fashion since infrastructure 41 is accessible to any enterprise having the necessary credentials. Further explanation regarding the workings of network communications and webserver access and database access and storage of information shall be omitted since they are well understood concepts and known in the industry, except to the extent needed to explain features and structure of the herein described invention.

Figure 4:
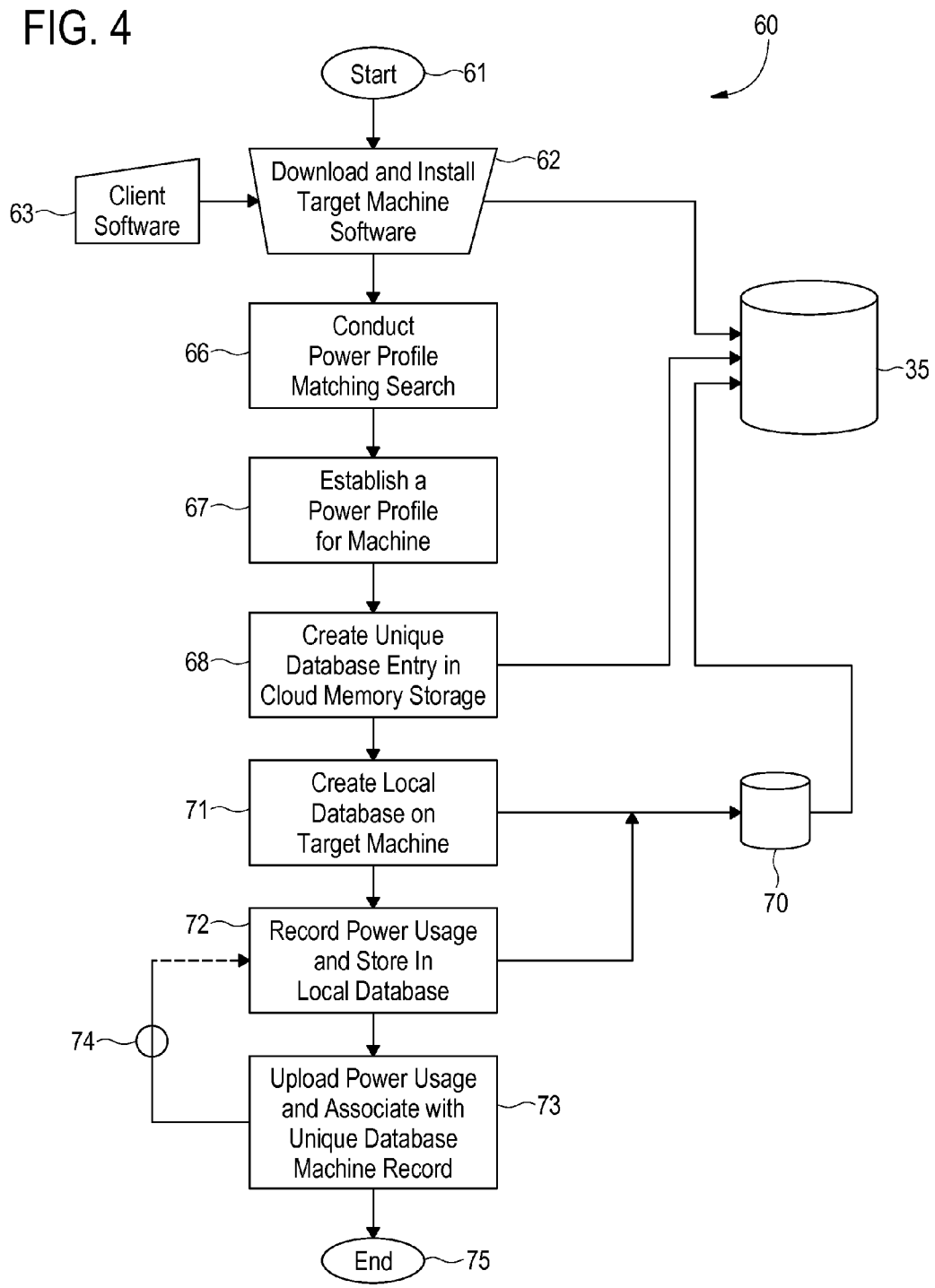
FIG. 4 is flow diagram showing the steps for establishing a profile on a target computing device.

Once a sufficient number of model workstations are recorded in database 35 representative of other workstations present in a computing enterprise, target machines in the enterprise 45 may be profiled pursuant to process 60 shown in FIG. 4. Client software 63 is accessed from a target machine held by storage 35 via a standard web browser processed by webserver 42. The software is then downloaded and installed on the target machine 62, and a profile matching process initiated 66 to search records in database 35 and a best matched profile assigned to the target machine 67. The client software runs as a background process managed by the target machine operating system.

Referring to Tables 2, 3, and 4 below, the matching process and the establishment of power profile values may be seen. Table 2 represents a search criteria basis that may be applied to each target machine to provide a match basis for creating a target machine profile. As shown, a match level may be assigned a value of 0 to 6, with 6 being the least similar hardware potential match and 0 being the most similar hardware potential match. Matches are determined by matching keyword or key-numeral entries in the model profile critical power fields indicated in Table 1. The center column indicates a pre-assigned match value. A 0 value represents a match to the MAC address of the originally profiled model machine and indicates an identical match to that exact model machine. A level 1 match indicates a match of the processor, CPU Speed, the amount of RAM present in the PC, the number of CPUs, and the number of monitors present. A level 2 match indicates a match of all of the items in level 1 except for the processor name. A level 3 match indicates a match of all of the items of level 1 except for the processor name and CPU speed. A level 4 match indicates the matches in level 3 less the number of CPUs. A level 5 match indicates a match only in the number of monitors present, and a level 6 match indicates no matches from any model machine elements in any model machine profiles.

TABLE 2

| Column 1 Precision Match Level | Column 2 Search Criteria Matched | Column 3 Power Metric Calculations |
|---|---|---|
| 0 (Exact/Best) | MAC Address (unique match) | Identical with model machine profile since this is the model machine. |
| 1 | Processor, CPU Speed, RAM, No. of CPUs, No. of Monitors | Average power values (Base Level, Monitor Watts, CPU Slope, etc.) of all profiles matched to these criteria. |
| 2 | CPU Speed, RAM, No. of CPUs, No. of Monitors | |
| 3 | RAM, No. of CPUs, No. of Monitors | |
| 4 | No. of CPUs, No. of Monitors | |
| 5 | No. of Monitors | |
| 6 (None/Worst) | None | Average of all profiles present within enterprise 45. |

Power profile values are then assigned based upon the match levels in column 2 as shown in the corresponding power metric calculations of column 3. For example, Table 3 shows calculations for a new profile being assigned to a target machine that has matched one of the model machine profiles in 3 areas; namely, RAM size, the number of CPUs present, and the number of attached monitors. The critical power profile fields held in any power profile record are shown in column 1, which correspond to the information shown in the file of Table 1 and are specifically shown in column 2 of table 3. The model profile power information currently held in the database 35 are listed in columns 3-5.

Hence, as can be seen, the match value of the example in Table 3 is 3 since 3 values in the target machine (column 2) match 3 values in two model machine profiles. Specifically, profiles B and C (columns 4 and 5) of the three model machine profiles match 3 values in the target machine (column 2). In order to establish a usable power profile for each target machine, three values are needed as calculated above for the model machines above: (1) monitor watts; (2) Base Power Level; and (3) a CPU slope. In order to arrive at these values, the corresponding values held for each power value field in the model profiles B and C are averaged together and assigned to the appropriate target machine power value. So, for example and as shown in column 6 of Table 3, monitor wattage values 9.1 and 7.5 are averaged together to obtain a value of 8.3 which is assigned to the target machine monitor power value. For base power levels in the target machine, model profiles of 29.63 and 20.22 are averaged to yield 24.93 as shown, and that is the value assigned to the target machine base power level. And, the CPU slopes of 0.223 and 0.240 in the model machines are averaged to yield a CPU slope of 0.2315 for the target machine.

TABLE 3

| Column 1 Profile Fields | Column 2 New Profile | Column 3 Profile A | Column 4 Profile B | Column 5 Profile C | Column 6 |
|---|---|---|---|---|---|
| Processor | Intel M | Intel i7 | Intel i5 | Mac Processor | |
| CPU Speed | 1800 | 3900 | 2700 | 4000 | |
| RAM | 4 GB | 8 GB | 4 GB | 4 GB | |
| No. Of CPUs | 2 | 4 | 2 | 2 | |
| No. Of Monitors | 1 | 2 | 1 | 1 | Averages |
| Monitor Watts | needed | 9.4 | 9.1 | 7.5 | 8.3 |
| Base PWR Level | needed | 35.70 | 29.63 | 20.22 | 24.93 |
| CPU Slope | needed | 0.1138 | 0.223 | 0.240 | .2315 |

Another example is shown in Table 4. The shown target machine has two matches, namely the number of CPUs present and the number of monitors present for two model machines (matching profiles A and C). Hence, the target machine has a match level of 2, and the three values of (1) monitor watts; (2) Base Power Level; and (3) a CPU slope are calculated by averaging the values present in the A and C profiles for these values. Hence, monitor wattage value of 8.45 is obtained by averaging 9.4 and 7.5, a base power level of 27.96 is obtained by averaging 35.70 and 20.22, and a CPU slope of 0.1769 is calculated by averaging 0.1138 and 0.024, as shown in column 6.

TABLE 4

| Column 1 Profile Fields | Column 2 New Profile | Column 3 Profile A | Column 4 Profile B | Column 5 Profile C | Column 6 |
|---|---|---|---|---|---|
| Processor | Intel M | Intel i7 | Intel i5 | Mac Processor | |
| CPU Speed | 1800 | 3900 | 2700 | 4000 | |
| RAM | 4 GB | 8 GB | 2 GB | 6 GB | |
| No. of CPUs | 2 | 2 | 4 | 2 | |
| No. of Monitors | 1 | 1 | 1 | 1 | Averages |
| Monitor Watts | needed | 9.4 | 9.1 | 7.5 | 8.45 |
| Base PWR Level | needed | 35.70 | 29.63 | 20.22 | 27.96 |
| CPU Slope | needed | 0.1138 | 0.223 | 0.24 | .1769 |

Once the values are averaged and calculated as shown in column 6, a model machine profile record is created and those values saved into the power profile fields for that profile record, and that profile record is saved 68 in cloud storage 35. A local database 70 is also created 71 to record the new profile power values, and those values are used to calculate power in the target machine during power calculation process 76 (see FIG. 5).

Figure 5:
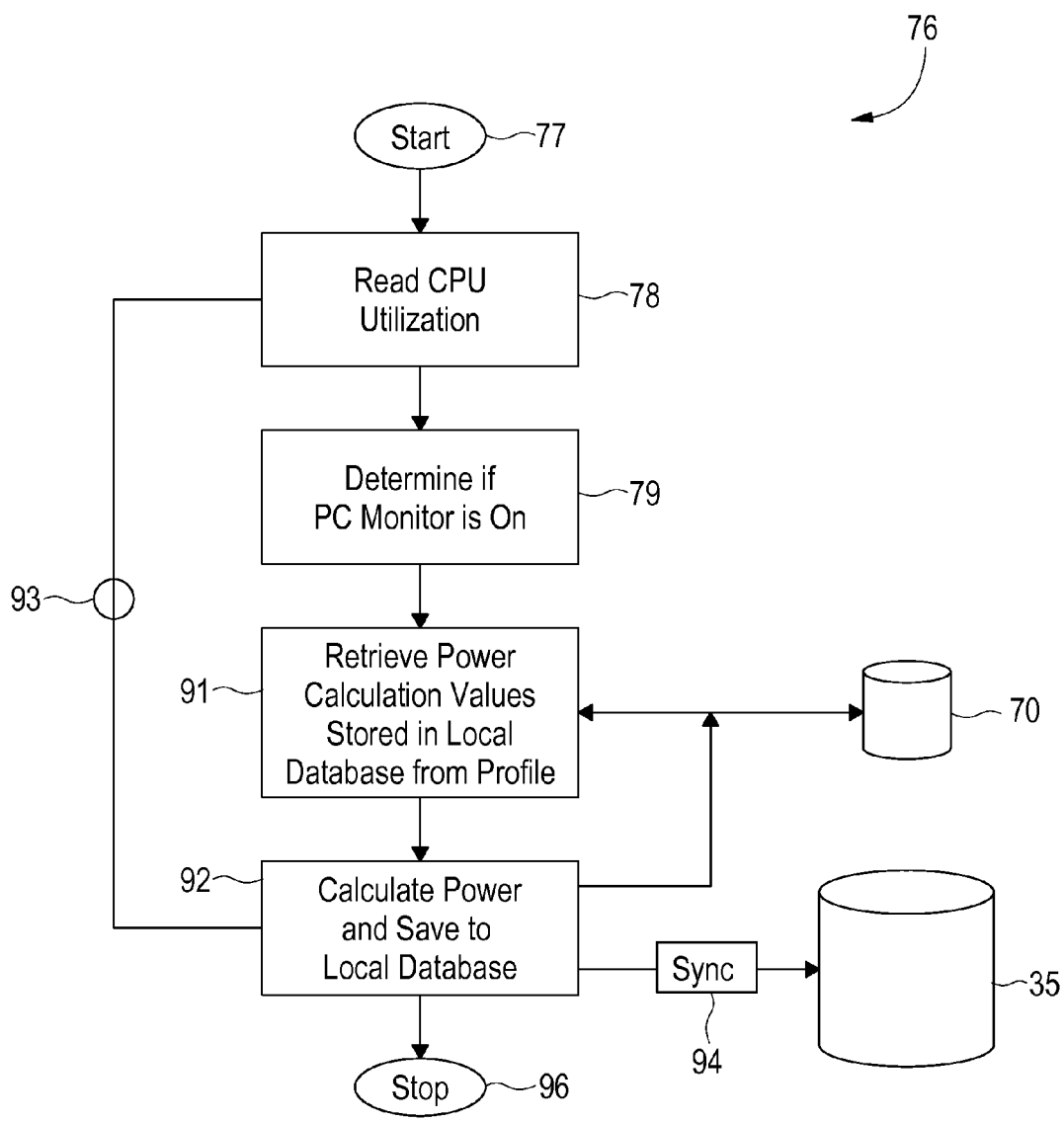
FIG. 5 is flow diagram showing the steps for calculating power in a target machine based upon an established target machine power profile; and, FIG. 6 is flow diagram showing steps for power calculations in an enterprise network environment with responsive power scheme deployment.

Referring now to FIG. 5, process 76 shows how power calculations are calculated using the profile saved in the local database 70 pursuant to prior process 60. Initially, CPU utilization is read 78 and a determination made as to whether attached PC monitor(s) are attached and turned on 79. Power profile values saved in the local database profile are then retrieved 91 and power during a 10 second period calculated 92 and saved to database 70. Power is calculated in accordance with the right column shown in Table 5 below. By using the profiling system described above, accuracies of 95% are typical for category 3 matches or higher, and if sufficient power profile models are present, even matches in the 4-6 categories can result in accuracies as high as 90%.

TABLE 5

Power Usage Calculations

| Condition/Basis | Calculations |
|---|---|
| If Monitor(s) is On | Power (in Watts) = Base Power Level + (CPU utilization * CPU Slope Value) + Idle Monitor Power Value |
| If Monitor(s) is Off | Power (in Watts) = Base Power Level + (CPU utilization * CPU Slope Value) |
| Total Calculated Power (in Watts) | Kwh (Kilowatt Hours) = Watts * ((No. of Minutes Between Readings * Number Of Readings)/60)/100 |

Once calculated, the total calculated power is saved 92 in database 70 and synchronized with database 35 over the Internet every 30 minutes 94. The process is repeated every 30 minutes pursuant to control element 93 unless earlier terminated 95 pursuant to a user command, a remote management instruction, or local machine interrupts.

Referring again to FIG. 3, workstation 47 may be designated as a captain machine that may communicate with other workstations 49-51, and 52-53 (when on the network). While nominally, each workstation 47-51 initiates all communication with storage 35 via webserver 42 to upload profiles and upload power recordations and calculations, the webserver 42 cannot typically communicate directly with each workstation. However, a designated captain workstation may receive commands directly from the webserver 42 and then distribute either automated webserver commands or commands initiated by user 58. In this manner the communications load from workstations for webserver is reduced and offloaded to captain workstations that communicate directly with other workstations via peer to peer networking 54.

Profiles are checked each day to ensure that the best possible profile values are being applied to each workstation. For example, if additional profiles are added to the storage 35 that more closely matches a particular workstation, new profile values based on new averaged power profile values will be stored in a workstation's profile replacing the old values held by database 35. Those improved values and then be retrieved by the workstation and utilized in the next set of power calculations processed by that workstation. Moreover, as more model profiles are added to database 35, a respective enterprise (e.g. 45) may utilize values from model profiles in enterprises 55-56 and vice versa to establish better potential match levels for each profiled machine and better power profile values. As better profile values are established for each profiled machine, more accurate power calculations will result. Therefore, inter power profile exchanges between organizations will occur to the benefit of all with an expectation that power accuracies will approach 1%-2% of actual recorded values using a power meter.

Figure 6:
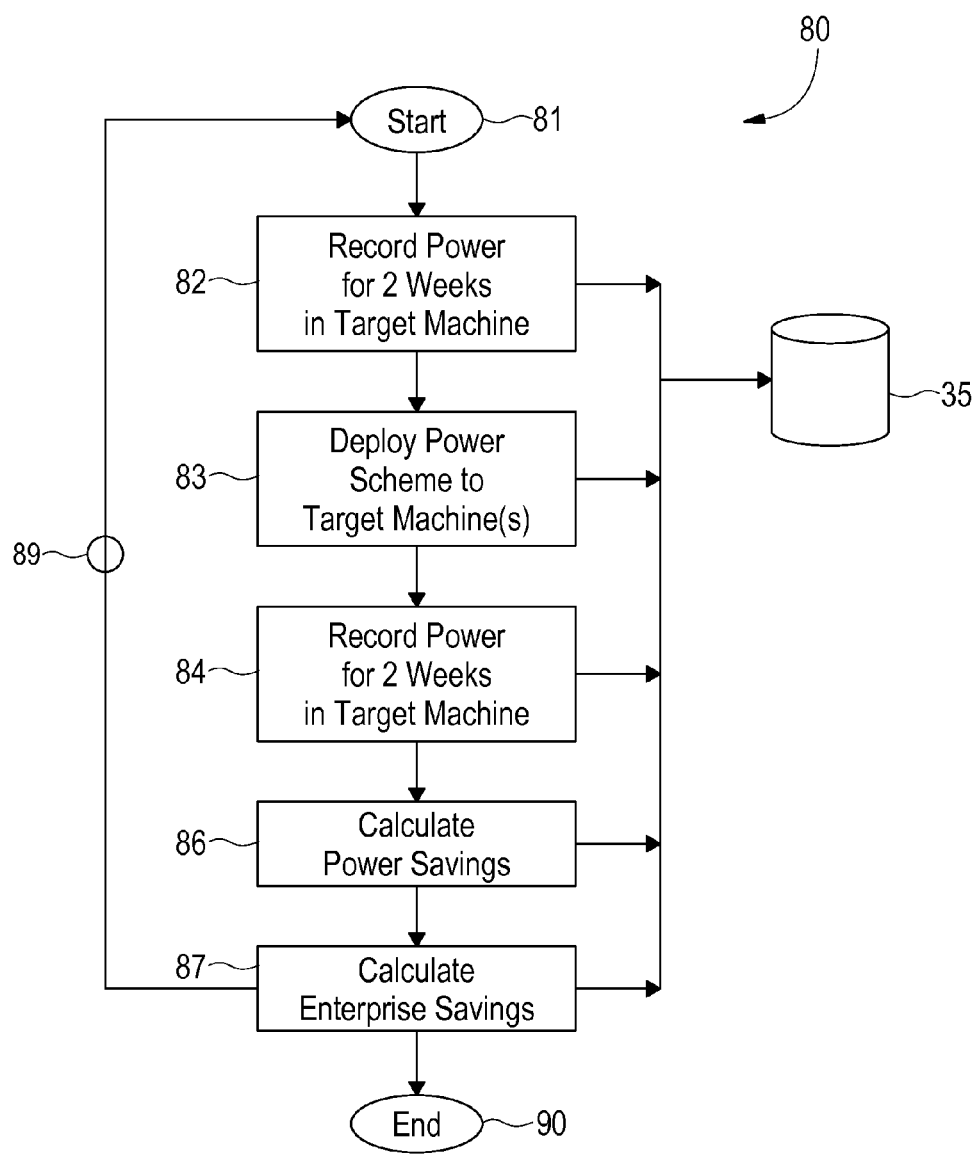

Referring now to FIG. 6, it may be seen that the enterprise organization shown in FIG. 3 may combine the results of power recordations to practically determine power consumption in their computing enterprise. Once a profile has been established for each machine in the organization, two weeks of power may be recorded 82 on every machine and saved to storage 35. Power schemes can be deployed 83 from captain workstation 47 to other workstations responsive to user deployment commands from workstation 58. Power calculations are then performed and recorded 84 for another 2 week period after the power scheme deployment, and the difference in each workstation power usages calculated 86. Such power saving calculations can be summed together via typical database analysis when accessed via workstation 58 on demand so that total enterprise power savings may be ascertained 87. This can be done annually per automated or semi-automated control 89 to consistently monitor power savings during extended periods, and thereby allowing for cost savings to be understood, continually. The result is that IT resource cost for power deployment schemes and workstation model selection may be applied to alter enterprise workstation configuration and workstation type in the most practical and cost effective manner.

While I have shown my invention in one form, it will be obvious to those skilled in the art that it is not so limited but is susceptible of various changes and modifications without departing from the spirit thereof.

Having set forth the nature of the invention, what is claimed is:

1. A method for calculating power in a target computing device, comprising the steps of:
   a. attaching a power meter to a model computing device;
   b. recording power consumption for said model computing device during a series of predefined operating power levels;
   c. based upon said power recording step, establishing a power profile for said model computing device that includes hardware parameters representative of said model computing device and representative power consumption parameters for said model computer device;
   d. repeating steps a through c for a plurality of model computing devices and saving each created model profile in memory storage;
   e. running client software on a target computing device and matching representative hardware elements of said target computing device with hardware elements recorded in said model power profile saved in said memory storage;
   f. responsive to said hardware matching step, establishing a power profile for said target computing device; and,
   g. calculating power for said target computing device based upon said target computing device power profile;
   wherein each said power profile includes numerical values for each of the following: a CPU power slope value; a base power value; and,
   a monitor power consumption level value.

2. The method as recited in claim 1, wherein said step of matching representative hardware elements in said target computing device and said step of utilizing model power profile values further comprise the steps of:
   searching a predetermined set of hardware elements recorded in each model profile for matches with said representative target computing device hardware elements and identifying profiles with the highest level of matches;
   averaging the power profile values used in calculating power saved in model device profiles that have the best hardware matching scores with said target device; and,
   assigning those averaged power profile values to said target power profile.

3. The method as recited in claim 2, wherein said step of calculating power in said target computing device comprises the steps of:
   determining whether a monitor of the target computing device is in a turned on state;
   if said monitor is turned on, calculating power in accordance with the following formula:

Power (in Watts)=Base Power Value+(CPU utilization*CPU Power Slope Value)+Idle Monitor Power Value;

if said monitor is turned off, calculating power in accordance with the following formula:

Power (in Watts)=Base Power Value+(CPU utilization*CPU Power Slope Value).

4. The method as recited in claim 3, further comprising the steps of re-matching representative hardware elements in said target computing device to hardware elements held in said plurality of model power profiles and updating the target computing device power profile with improved power profile values if a higher match accuracy is found in said memory storage.

5. The method as recited in claim 3, further comprising the steps of:
   utilizing the established target computing device power profile to calculate power in said target computing device for a preselected period of time representative of typical system usage in a computing enterprise;
   saving the calculated power to a memory storage;
   configuring said target computing device with a power scheme for reducing power in said target computing device;
   utilizing the established target computing device power profile to re-calculate power in said target computing device for the same preselected period of time as in said first power computing step;
   saving the re-calculated power to a memory storage; and,
   comparing the two calculated power amounts to determine the power savings between the two.

6. The method as recited in claim 1, wherein said step of calculating power in said target computing device comprises the steps of:

determining whether a monitor of the target computing device is in a turned on state;

if said monitor is turned on, calculating power in accordance with the following formula:

Power (in Watts)=Base Power Value+(CPU utilization*CPU Power Slope Value)+Idle Monitor Power Value;

if said monitor is turned off, calculating power in accordance with the following formula:

Power (in Watts)=Base Power Value+(CPU utilization*CPU Power Slope Value).

7. A system for calculating power in a target computing device, comprising:
   a. means for recording power consumption in a model computing device during a series of predefined operating power levels and recording those results;
   b. means responsive to said power recording means for establishing a power profile for said model computing device that includes hardware parameters representative of said model computing device and representative power consumption parameters for said model computer device;
   c. cloud positioned memory for receiving and recording a plurality of model computing device profiles responsive to said power profile means;
   d. means running on a target computing device for matching selected hardware elements present in said target computing device with hardware element present in said model profiles saved in said cloud positioned memory and establishing a power profile for said target computing device responsive thereof; and,
   e. means running on said target computing device for calculating power for said target computing device based upon said target computing device power profile;
   wherein each said power profile includes numerical values for each of the following: a CPU power slope value; a base power value; and, a monitor power consumption level value.

8. The system as recited in claim 7, further including:
   means for searching a predetermined set of hardware elements recorded in each model profile for matches with said representative target computing device hardware elements and identifying the profiles with the highest level of matches;
   means for averaging the power profile values used in calculating power saved in model device profiles that have the best hardware matching score with said target device; and,
   means for assigning those averaged power profile values to said target power profile.

9. The system as recited in claim 8, wherein said power calculation means further comprises:
   means for determining whether a monitor of said target computing device is in a turned on state;
   means responsive to said monitor state determination means for calculating power in accordance with the following formula when said monitor is found to be in a turned on state:

Power (in Watts)=Base Power Value+(CPU utilization*CPU Power Slope Value)+Idle Monitor Power Value;

means responsive to said monitor state determination means for calculating power in accordance with the following formula when said monitor is found to be in a turned off state:

Power (in Watts)=Base Power Value+(CPU utilization*CPU Power Slope Value).

10. The system as recited in claim 7, further comprising:
    means for utilizing the established target computing device power profile to calculate power in said target computing device for a preselected period of time representative of typical system usage in an computing enterprise;
    means for saving the calculated power to a memory storage;
    means for configuring said target computing device with a power scheme for reducing power in said target computing device;
    means for utilizing the established target computing device power profile to re-calculate power in said target computing device for the same preselected period of time utilized by said power calculation means;
    means for saving the re-calculated power to a memory storage; and,
    means for comparing the two calculated power amounts to determine the power savings between the two.

11. A method for calculating power in a target computing device based on a prior profiled model device, comprising the steps of:
    a. causing said target computing device to access a database holding a plurality of power profiles for model devices similar to said target computing device, wherein each said model power profile includes hardware elements representative of the model computing device to which each model power profile is associated;
    b. matching representative hardware elements in said target computing device to hardware elements held in said plurality of model power profiles and assigning a matching score to said target computing device;
    c. based on said matching score, utilizing power profile values held by model power profiles associated with said matching score to create a power profile for said target computer device;
    d. saving said target computing device power profile in memory storage; and,
    e. calculating power for said target computing device based upon said target computing device power profile;
    wherein each said power profile includes numerical values for each of the following: a CPU power slope value; a base power value; and, a monitor power consumption level value.

12. The method as recited in claim 11, wherein said step of matching representative hardware elements in said target computing device and said step of utilizing model power profile values further comprise the steps of:
    searching a predetermined set of hardware elements recorded in each model profile for matches with said representative target computing device hardware elements and identifying the profiles with the highest level of matches;
    averaging the power profile values used in calculating power saved in model device profiles that have the best hardware matching score with said target device; and,
    assigning those averaged power profile values to said target power profile.

13. The method as recited in claim 12, wherein said step of calculating power in said target computing device comprises the steps of:
    determining whether the monitor of the target computing device is in a turned on state;
    if said monitor is turned on, calculating power in accordance with the following formula:

Power (in Watts)=Base Power Value+(CPU utilization*CPU Power Slope Value)+Idle Monitor Power Value;

if said monitor is turned off, calculating power in accordance the following formula:

Power (in Watts)=Base Power Value+(CPU utilization*CPU Power Slope Value).

14. The method as recited in claim 11, further comprising the steps of:
utilizing the established target computing device power profile to calculate power in said target computing device for a preselected period of time representative of typical system usage in a computing enterprise;
saving the calculated power to a memory storage;
configuring said target computing device with a power scheme for reducing power in said target computing device;
utilizing the established target computing device power profile to re-calculate power in said target computing device for the same preselected period of time as in said first power computing step;
saving the re-calculated power to a memory storage; and,
comparing the two calculated power amounts to determine the power savings between the two.

15. The method as recited in claim 11, further comprising the steps of re-matching representative hardware elements in said target computing device to hardware elements held in said plurality of model power profiles and updating the target computing device power profile with improved power profile values if an improved match score is found in said database.

\* \* \* \* \*